United States Patent [19]

Walser

[11] Patent Number: 4,531,435

[45] Date of Patent: Jul. 30, 1985

[54] VENEER LATHE CHUCK

[75] Inventor: Donald C. Walser, Surrey, Canada

[73] Assignee: Forintek Canada Corp., Canada

[21] Appl. No.: 428,477

[22] Filed: Sep. 29, 1982

[51] Int. Cl.[3] .......................... B23B 33/00; B27L 5/00

[52] U.S. Cl. .................................. 82/40 R; 144/209 R

[58] Field of Search ........................ 144/209 R, 209 A; 82/40 R; 142/57; 269/53, 54.5

[56] References Cited

U.S. PATENT DOCUMENTS

| | | | |
|---|---|---|---|
| 1,469,360 | 10/1923 | Cullen | 144/209 |
| 3,221,787 | 12/1965 | Hitt | 144/209 |
| 3,273,611 | 9/1966 | Hagquist et al. | 142/53 |
| 3,323,566 | 6/1967 | Hitt | 82/40 |
| 3,995,869 | 12/1976 | Mazingue | 279/33 |
| 4,141,397 | 2/1979 | Schmidt | 144/209 |
| 4,239,071 | 12/1980 | Ritchie | 144/209 |
| 4,271,881 | 6/1981 | Hitt | 144/209 |
| 4,342,348 | 7/1982 | Lichtenwalter | 82/40 |

FOREIGN PATENT DOCUMENTS

| | | | |
|---|---|---|---|
| 582157 | 9/1958 | Italy | 82/40 |

*Primary Examiner*—Francis S. Husar
*Assistant Examiner*—William E. Terrell
*Attorney, Agent, or Firm*—Fetherstonhaugh & Co.

[57] ABSTRACT

A chuck for a veneer lathe is provided, which has a generally wedge-shaped lug with a first, corrugated face, preferably of a stepped configuration. Such a chuck reduces the tendency of a lug to split during processing, and thus reduces chuck spin-out and resultant wastage.

16 Claims, 6 Drawing Figures

VENEER LATHE CHUCK

FIELD OF THE INVENTION

This invention relates to a chuck for veneer lathes.

DESCRIPTION OF THE PRIOR ART

Veneer is commonly produced by peeling a thin layer of wood from a log mounted between opposed spindles of a veneer lathe. Rotational movement of the spindles is transferred to rotate the log by virtue of chucks which are engaged on opposed ends of respective spindles. The chucks are provided with a generally wedge-shaped lugs with smooth surfaces, which lugs are intended to be pressed into respective ends of the log by means of inwardly directed force applied through the spindles. The wedge-shaped lugs of course facilitate entry of the lugs into the ends of the log. On many lathes, a plurality of concentric chucks are provided to penetrate respective ends of the log, the outer chucks withdrawing as the log is peeled to successively smaller diameters.

Driving the wedge-shaped lugs into ends of the log, tends to cause the log to split longitudinally resulting in spin-out of the chucks and consequent log wastage. Spin-outs of the chucks are often caused by the chucks splitting the log ends resulting in loss of grip. Typically, 10% of veneer logs processed result in spin-outs, often caused by splitting of the block ends by the wedge-shaped lugs of the chucks.

Various constructions of chucks have been suggested in the past, apparently with a view to minimizing splitting and consequent spin-out. For example, U.S. Pat. No. 3,323,566 to Hitt, discloses a chuck having wedge-shaped lugs oriented at various angles with respect to the rotational axis of the chuck. Although such may provide increased grip on the log ends, the wedge-shaped chucks and consequent splitting problem, remain. U.S. Pat. No. 4,141,397 to Schmidt discloses a chuck having curved, wedge-shaped lugs apparently to improve the grip of the chuck. However, again the basic wedge shaped lugs and the consequent splitting problem inherently resulting from such a shape, remain. U.S. Pat. No. 4,271,881 to Hitt discloses chucks having a plurality of curved, relatively thin, blades to penetrate the log ends. Such relatively long, thin blades for the most part eliminate the splitting problem inherent in utilizing chucks with wedge-shaped lugs. However, such blades are of limited practical use since they will obviously have limited strength and stiffness to transmit peeling torque during operation of the lathe, and to prevent breakage of the blades by knots or other imperfections in the logs during the forceful entry of the blades into the log ends.

It is desirable then to have a veneer lathe chuck which is provided with lugs of an inherently strong shape for transmitting torque during peeling and resisting breakage during entry into the log, which at the same time will minimize or eliminate the longitudinal splitting problem associated with conventional smooth, wedge-shaped lugs.

SUMMARY OF THE INVENTION

A chuck head is provided, which comprises a generally wedge-shaped chuck having a plurality of transversely extending corrugations on a first face of it. Preferably, the entire first face has such corrugations on it. These corrugations are most usefully of a stepped configuration.

Of the various possible shapes of the lug, it is preferred that it is substantially straight and extends radially. As well, it is at the same time advantageous to provide a plurality of vertically extending corrugations on a second face of the lug. Such corrugations on the second face most usefully have a transversely triangular shape.

A chuck head having a plurality of lugs, as previously described is also provided. Preferably, the lugs on such a chuck head are substantially straight and extended radially, and have respective first faces facing in the same rotational direction. In addition, it is preferred where the second faces of the lug are provided with vertical corrugations, that such corrugations extend from adjacent an upper surface of the chuck head to a position below an upper edge of the lug.

It is also advantageous that the lugs on the chuck head are shaped and disposed so that no two lugs are colinear.

DRAWINGS

Embodiments of the invention will now be described in detail with reference to the drawings, in which.

DESCRIPTION OF THE PREFERRED EMBODIMENTS

Figure 1:
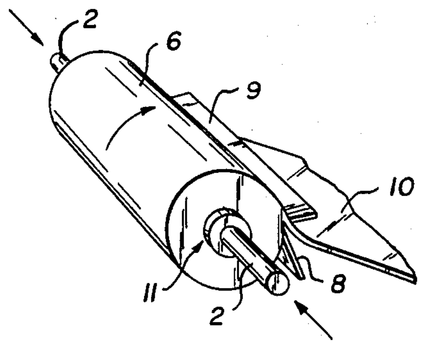
FIG. 1 is a schematic representation of a typical veneer lathe.

A veneer lathe as shown schematically in FIG. 1, includes two spindles 2 driven by well known means (not shown), having chucks 11 connected to respective proposed ends. FIG. 1 shows the chucks 11 holding a log 6 being processed to produce veneer. Peeling of the log 6 takes place as the log 6 is turned by the rotating spindles 2 and connected chucks 11 against a knife 8, thereby producing veneer 10. A pressure bar 9 applies a preselected pressure to a position on the log 6 adjacent the knife 8 and on the opposite side of the veneer 10, in order to smooth out the peeling process in a well known manner.

Figure 2:
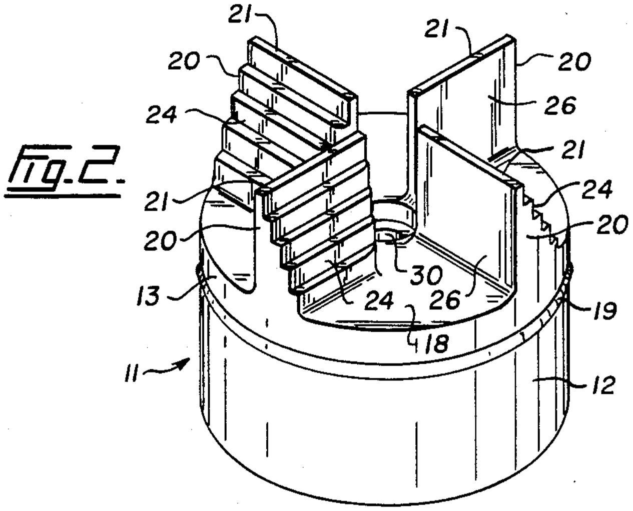
FIG. 2 is a perspective view of a chuck with a chuck head according to the present invention.

Each of the chucks 11, as is shown most clearly in FIG. 2, include a body 12 and chuck head 13 with a top surface 18 and axial bore 30. The chuck head 13 is connected to the body by means of a weld 19. The chuck head 13 has four equally spaced, straight, generally wedge-shaped lugs 20 extending upward therefrom, and radially thereon. Each of the lugs 20 has a first face 24 which is entirely corrugated, the corrugations being of a stepped configuration as shown. Each of the lugs 20 also has a second flat face 26 which is coplanar with the rotational axis of the chuck 14. As will be seen from FIG. 2, all of the first faces 24 of the lugs 20, face in the same circular direction, that is they all face counterclockwise in the view of FIG. 2.

Figure 3:
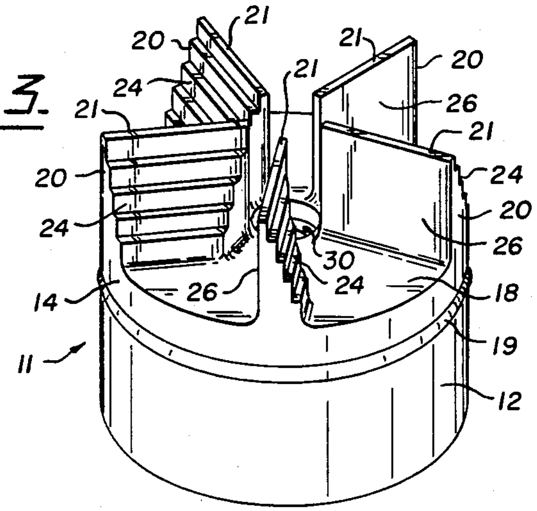
FIG. 3 is a perspective view of a chuck with a chuck head of another embodiment of the chuck according to the present invention.

Referring to FIG. 3, a chuck 11 with another embodiment of the chuck head of the present invention is shown. The chuck head 14 shown in FIG. 3 is constructed in a similar manner as the chuck 13 shown in FIG. 2, and analogous parts have been identically numbered. However, the chuck 13 is provided with a total of five equally spaced lugs. Such an odd number of lugs 20 is preferred since such will result in no two lugs 20 being colinear and thereby tend to reduce splitting even further over a chuck such as chuck 13, which has an even number of lugs 20.

Figure 4:
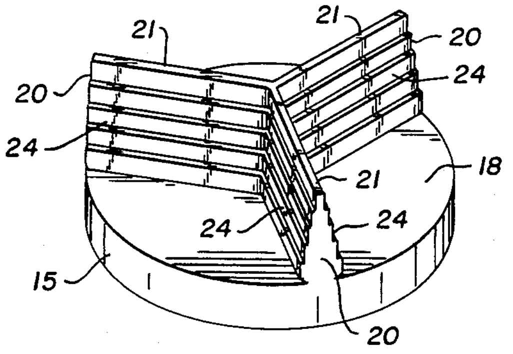
FIGS. 4 to 6 are perspective views of other chuck heads according to the present invention.
Figure 5:
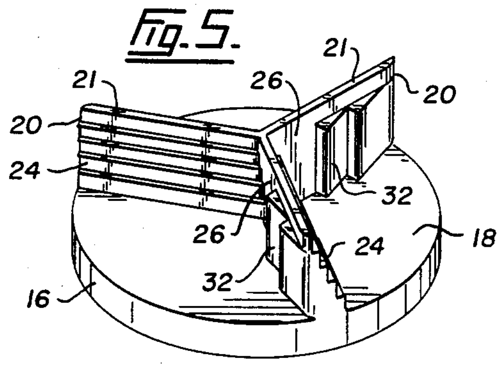
Figure 6:
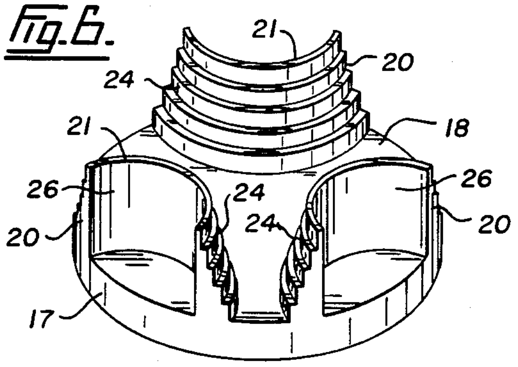

Other embodiments of chuck heads are shown in FIGS. 4 to 6, again which have analogous parts numbered the same as those of the chuck heads shown in FIGS. 2 and 3. FIG. 4 shows a chuck head 15 having lugs with stepped corrugations on both sides. FIG. 5 shows a chuck head 16, having lugs 20 with corrugated first faces 24 as previously described, and also with vertical corrugations 32 of a transverse triangular shape on second faces 26 of the lugs 20. The chuck head 17 as shown, has semi-circular lugs 20, which shape may minimize splitting in some logs.

The chucks heads 13 to 17 may be constructed of any suitable strong material, such as hardened steel. The entire chuck casting head is generally cast as a single unit. In use, the chucks 11 having chuck heads 13 to 17 are used in the same well known manner as other standard chucks, two being attached to respective spindles 2 by means of bolts or the like passing through a hole 30 in the chuck body 16, or by other well known means. Of course, the two chucks should have the first faces 24 of their respective chuck head lugs 20 facing in opposite circular directions where the lugs are of the shape and arrangement shown in FIGS. 2 to 5 and arranged in the spindles 2 so that their respective second faces 26 are facing in the direction of rotation of their attached spindles 2. A suitable log 6 is then provided between the then opposed pair of chucks, and usually hydraulic rams force the spindles 2 and attached chucks 11, toward respective ends of the log 6. It has been found that the lugs 20 will be pressed into the ends of the log 6, with somewhat greater resistance than might be encountered with the usual wedge shaped lugs on standard chucks. However, it has been found that standard lathes have no difficulty in inserting the lugs 20 into the ends of the log 6. It has also been found that by virtue of the shape of the lugs 20, in particular with the stepped configuration of the first faces 24, although the lugs 20 are fairly readily inserted in the log 6, there is very little tendency of the lugs 20 to cause splitting of the log 6. In fact, under similar circumstances, it has been found that the tendency of the lugs 20 to split logs is dramatically less than encountered with standard wedge-shaped lugs. As a result, spin-out will be reduced which means that more veneer can generally be obtained from a given log. In addition, the corrugations 32 of the second face of the lugs 20 shown in FIG. 5, further minimize spin-outs even if some splitting has occurred, such corrugations apparently inhibiting transverse displacement of portions of the log 6. The spacing of an upper end of the corrugations 32 below on upper edge 21 of the lugs 20 ensures that the corrugations 32 do not unduly increase the force required for the lugs 20 to penetrate a lug.

Various modifications to the chucks described above are of course possible. For example, the relative dimensions of the lugs 20 could be altered. However, various limitations must be borne in mind in selecting the proper lug dimensions. Thus, it has been found that with a chuck head of about 3–4 inches in diameter, the lugs 20 should generally be about $1\frac{1}{2}$ inches high or less, and about $\frac{3}{8}$ inches or less maximum thickness. If the lugs are too thick, too much wood will be compressed by them and a proper grip not obtained.

In addition, the lugs must not be too high or too thin or bending may occur. If the lugs should be too short, a sufficient grip of the lug will not be possible.

Of course, chucks for an arrangement of a plurality of concentric chucks, can be constructed with lugs of the shape described above. As well various other orientations and shapes of lugs 20 are possible and well known for standard chuck heads. Such other arrangements have been used in the past to obtain additional gripping of the particular log being processed. The number of lugs 20 on a chuck can of course be varied, it being preferred that there is an odd number of equally spaced lugs so as to minimize any splitting tendency of the log. It will be understood of course, that at least two lugs will be required for practical operation of a chuck, and preferably at least three equally spaced lugs are utilized.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A chuck head comprising a substantially circular base rotatable about an axis of rotation and extending in a radial direction, perpendicular to the axis of rotation and including a generally wedge-shaped, substantially straight lug having a plurality of transversely extending corrugations of stepped configuration on substantially an entire first face thereof, the lug extending axially forwardly from a forward end of the chuck head, the lug extending radially of the head and having a plurality of corrugations extending axially of the head on a second face thereof.

2. A chuck head as described in claim 1 wherein said lug is substantially linear, extends radially of the head, and has a plurality of triangular corrugations on a second face thereof, the base of each triangular corrugation extending axially of the head with each triangle apex radially outward of the triangle base.

3. A chuck head as described in claim 1 having a plurality of lugs.

4. A chuck head as described in claim 3 wherein said lugs are substantially straight and extend radially of the head, and have respective first faces facing in the same rotational direction.

5. A chuck head as described in claim 4 wherein each of said lugs has a plurality of corrugations on a second face thereof, the corrugation extending axially of the head.

6. A chuck head as described in claim 5 wherein the corrugations of the second face of each lug are triangular in section with the triangle apex radially outward of the triangle base on the head.

7. A chuck head as described in claim 5 wherein the corrugations of the second face of each lug, extend from adjacent the base of the chuck head to a position below an outer edge of the lug.

8. A chuck head as described in claim 3 wherein said lugs are shaped and disposed so that no two thereof are colinear.

9. A chuck head comprising a substantially circular base rotatable about an axis of rotation and extending in a radial direction, perpendicular to the axis of rotation;

a lug extending axially from the base, the lug being generally wedge-shaped with the wedge narrowing with distance from the base as viewed from the circumference and the narrowing being achieved in a plurality of axially spaced steps on at least a first face of said lug, each step having one surface generally parallel to said base.

10. A chuck head as claimed in claim 9 in which said lug is substantially linear, extends radially of the head and has a plurality of triangular corrugations on a second face thereof, the base of each triangular corrugation extending axially of the head with one apex of each of said corrugations extending generally radially outwardly of the base of the triangle.

11. A chuck head, comprising:
(a) a base rotatable on an axis;
(b) a generally wedge-shaped substantially straight lug extending axially from said base and radially of said axis; and,
(c) a plurality of axially spaced corrugations disposed on a first face of said lug, each of said corrugations having a radially extending surface thereof generally parallel to said base with said lug narrowing with distance from said base when viewed from the periphery of said base.

12. The chuck head as defined in claim 11, wherein:
(a) said base being generally circular in plan.

13. The chuck head as defined in claim 11, wherein:
(a) at least three generally equiangularly disposed lugs extend from said base.

14. The chuck head as defined in claim 11, wherein:
(a) a plurality of corrugations extend from a second face of said lug.

15. The chuck head as defined in claim 12, wherein:
(a) said radially extending surfaces have a length substantially equal to the radius of said base.

16. The chuck head as defined in claim 13, wherein:
(a) said lugs being interconnected along said axis.

* * * * *